A. H. FORSYTHE.
INTERNAL COMBUSTION ENGINE.
APPLICATION FILED MAR. 29, 1910.

1,011,601.

Patented Dec. 12, 1911.
4 SHEETS—SHEET 2.

WITNESSES:
Ben. Joffe
Walton Harrison

INVENTOR
Albert H. Forsythe
BY Munn & Co.
ATTORNEYS

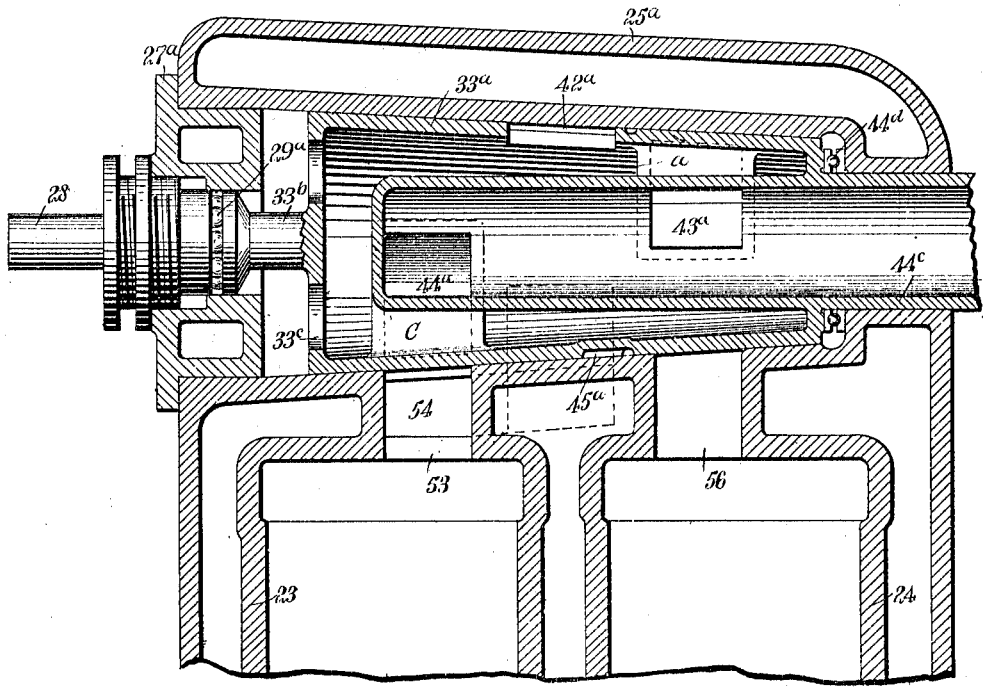
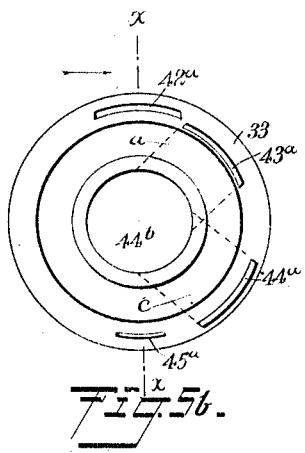

A. H. FORSYTHE.
INTERNAL COMBUSTION ENGINE.
APPLICATION FILED MAR. 29, 1910.
1,011,601.
Patented Dec. 12, 1911.
4 SHEETS—SHEET 4.
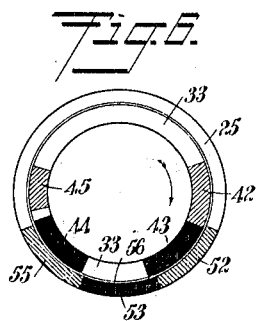
Fig. 6.
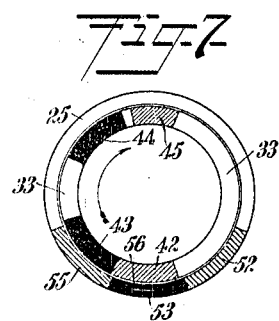
Fig. 7.
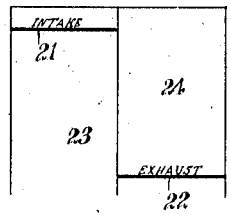
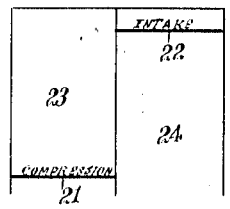
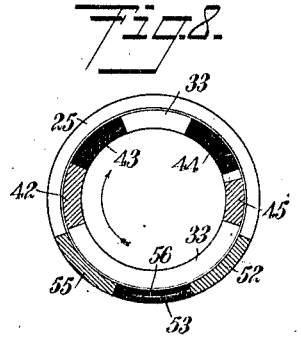
Fig. 8.
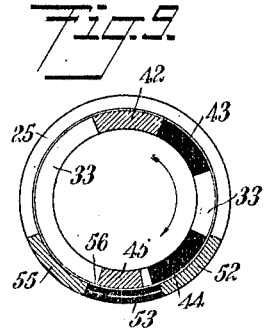
Fig. 9.
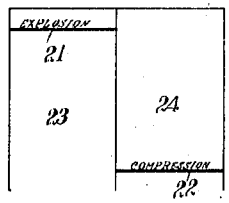
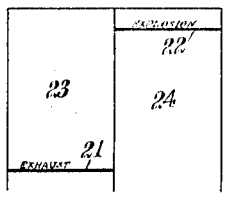
WITNESSES:
Ben Jeff
Walton Harrison
INVENTOR
Albert H. Forsythe
BY
ATTORNEYS

UNITED STATES PATENT OFFICE.

ALBERT HARRIS FORSYTHE, OF JOPLIN, MISSOURI.

INTERNAL-COMBUSTION ENGINE.

1,011,601.  Specification of Letters Patent.  Patented Dec. 12, 1911.

Application filed March 29, 1910. Serial No. 552,187.

*To all whom it may concern:*

Be it known that I, ALBERT H. FORSYTHE, a citizen of the United States, and a resident of Joplin, in the county of Jasper and State of Missouri, have invented a new and Improved Internal-Combustion Engine, of which the following is a full, clear, and exact description.

My invention relates to internal combustion engines, my more particular purpose being to provide an engine having a plurality of cylinders connected with a chest, the latter containing a rotating plug which takes care of the explosive charges admitted to the cylinders and also of the burned gases discharged from the cylinders after the various explosions.

More particularly stated, I provide a chest comprising a casing provided with ports, and a rotary plug mounted within said casing and provided with ports adapted to be brought periodically into registry with the ports of the casing, in such manner as to properly distribute the explosive charges and to lead the gases of combustion to the exhaust.

Reference is to be had to the accompanying drawings forming a part of this specification, in which similar characters of reference indicate corresponding parts in all the figures.

Figure 1:
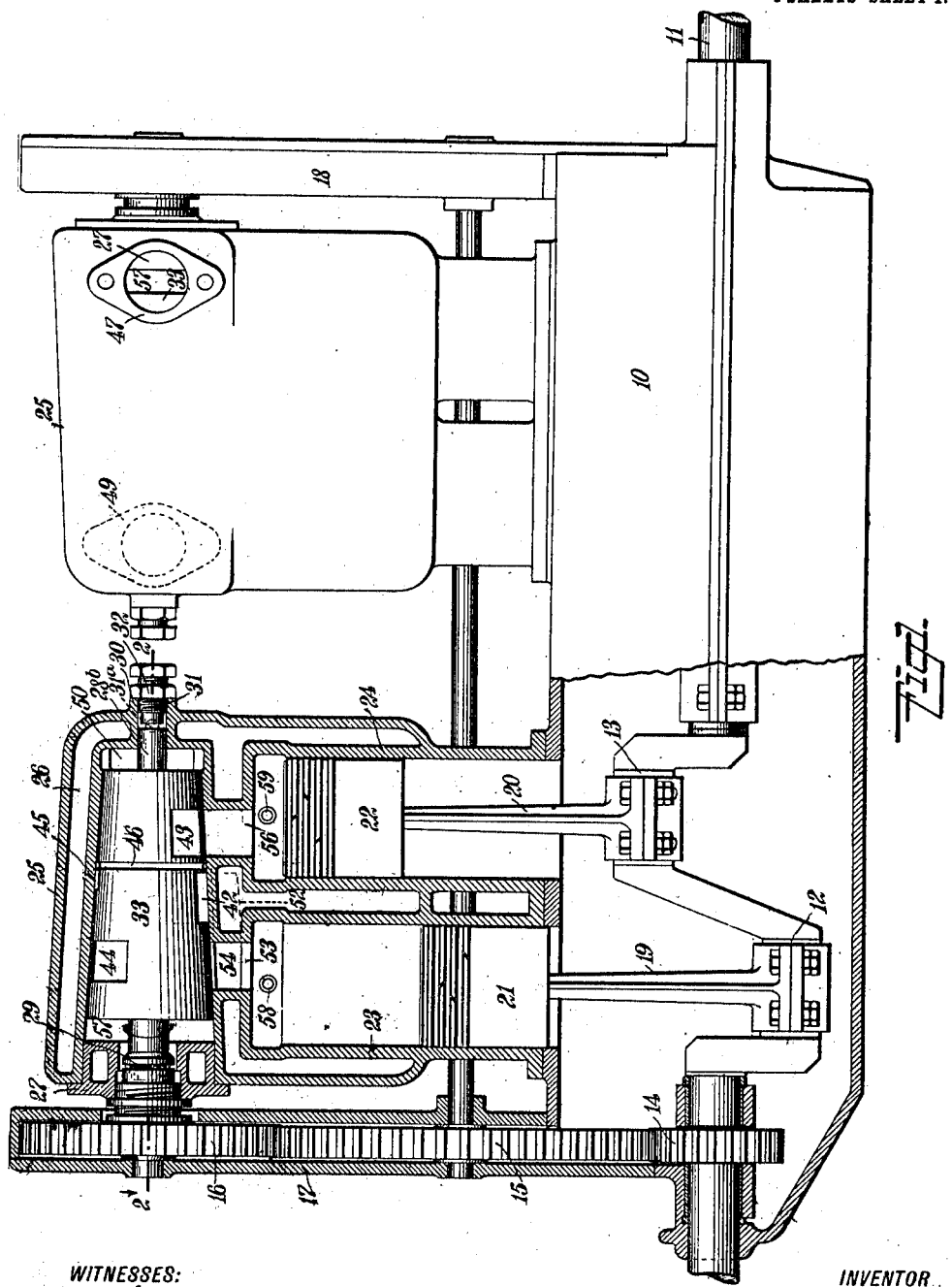
Figure 2:
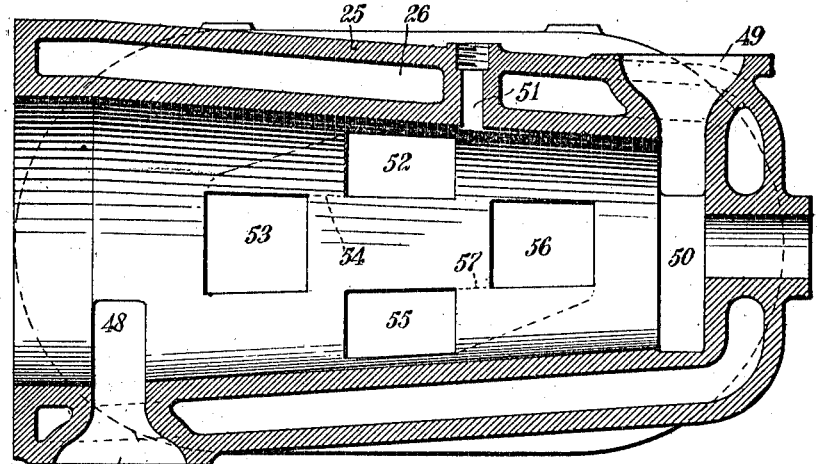
Figure 3:
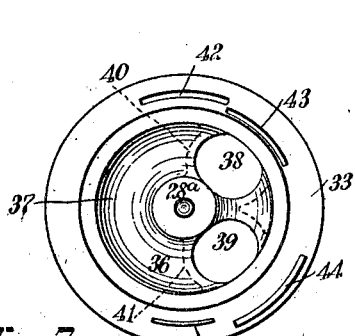
Figure 4:
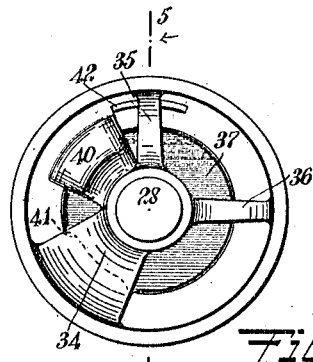
Figure 5:
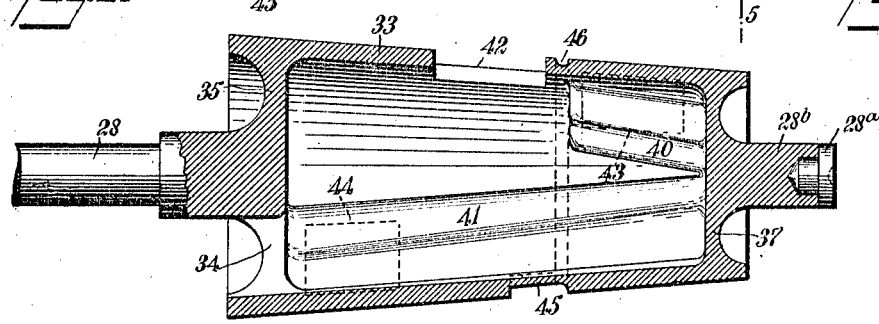

Figure 1 is a view partly in elevation and partly in section, showing my internal combustion engine with its valve casing and rotary valve; Fig. 2 is a fragmentary horizontal section through the valve casing, taken on the line 2—2 in Fig. 1, the rotating valve, however, being removed; Fig. 3 is an end elevation of the valve plug removed from its casing, this view showing the valve as it would appear in Fig. 5 when seen from a point at the right of Fig. 5; Fig. 4 is an end elevation of the valve shown in Fig. 5, this view disclosing the valve as it would appear to a person standing at the left of said Fig. 5; Fig. 5 is a central vertical section on the line 5—5 of Fig. 4, looking in the direction of the arrow; Fig. 5ª is a section on the line *x—x* of Fig. 5ᵇ looking in the direction of the arrow; Fig. 5ᵇ is an end elevation of the valve shown in Fig. 5ª, but removed from its mountings; Fig. 6 is a diagram indicating the relative positions of the engine pistons and the rotary plug, with one of the cylinders just beginning its intake stroke and the other just beginning its exhaust stroke; Fig. 7 is a diagram similar to Fig. 6, but showing the parts as they appear in Fig. 1—that is, one of the cylinders just beginning its compression stroke and the other just beginning its intake stroke; Fig. 8 is a diagram somewhat similar to Fig. 6, but showing the parts as they appear after the rotary plug is turned still further, so that an explosion has taken place in one cylinder and a compression stroke is being made in the other; and Fig. 9 is a view similar to Fig. 6, but showing the rotary plug as turned still further, so that one of the cylinders is beginning its exhaust stroke; whereas, an explosion is taking place in another cylinder.

At 10 is a crank casing and extending longitudinally through the same is a crank shaft 11 which carries cranks 12, 13. A pinion 14 mounted rigidly upon the crank shaft meshes with a gear 15, the latter meshing with another gear 16, these gears all being carried in a gear casing 17. At 18 is another gear casing containing gears similar to those just described.

At 19, 20 are pitmen which are journaled to the cranks 13, and connected with these pitmen are pistons 21, 22 which are slidably mounted in cylinders 23, 24. Above these cylinders is a valve casing 25 provided with a water jacket 26, the latter extending down around the cylinders 23, 24. One end of the valve casing 25 is closed by an annular closure plug 27.

Extending through each valve casing 25 is a revoluble shaft 28 which is provided with a ball bearing 29. At the opposite end of the casing is a bearing 30, and extending into the latter is a screw plug 31 held in position by aid of a nut 32. A ball 31ª is engaged by the screw plug 31 and engages a bearing plate 28ª carried by a journal neck 28ᵇ. Connecting the shaft 28 with a plug 33 are spider legs 34, 35, 36, as will be understood from Fig. 4. A partition 37 having generally an annular form connects the smaller end of the plug 33 with the journal neck 28ᵇ. The partition 37 is provided with two openings 38, 39, and leading to these openings are walls 40, 41 integral with and disposed internally of the plug 33 which is hollow. The openings 38, 39 (see Figs. 3, 5) are merely the ends of core passages bounded by the walls 40, 41. The plug 33 is provided with ports 42, 43, 44, 45 disposed in the positions indicated in Figs. 3 and 5. The port 45 I designate as an "air port." It is connected with an annular groove 46 extending entirely around the plug 33. Within one side of the valve casing 25 (see bottom of Fig. 2) is an inlet 47 which is continued at 48 so as to form a passage of considerable size. Upon the opposite side of the valve casing 25 is an exhaust 49 which merges into a passage 50 in the smaller end of the casing.

The casing 25 is provided with an air passage 51 leading radially inward and located in registry with the annular groove 46. The casing 25 is further provided with two ports 52, 53 connected together by a passage 54, and with two other ports 55, 56 connected together by a passage 57, as indicated in Fig. 2. The ports 53, 56 open directly into the cylinders 23, 24. The ports 52 and 55, therefore, do not extend entirely through the casing, but merely connect the passages 52 and 53 with the interior of the casing. Mounted within the cylinders respectively at 58, 59 are spark plugs or other appropriate ignition devices for firing explosive mixtures. The rotary plug 33, when in motion, turns in the direction indicated by the arrow in Fig. 1. Hence, the diagrams 6, 7, 8, 9 represent the plug 33 as if the observer were looking at the smaller end of the plug, as in Fig. 3. Fig. 1 shows the movable parts in the various positions indicated by the diagram in Fig. 7.

In the form shown in Fig. 5$^a$ the valve plug has a different construction. The cylinders and ports are the same as in Fig. 1. The valve plug 33$^a$ is connected to a shaft 33$^b$ by aid of a spider 33$^c$. The shaft 28 is supported by aid of a ball bearing 29$^a$, and the ball bearing is supported by a closure plug 27$^a$. The valve plug 33$^a$ is provided with passages 42$^a$, 43$^a$, 44$^a$, 45$^a$, corresponding to the passages 42, 43, 44, 45 in other figures. The passages 43$^a$, 44$^a$, however, are merely formed in cores which extend radially inward. These cores are integral with the tubular member 44$^c$ from which the exhaust takes place. A ball bearing 43$^d$ encircles this tubular member. Except for the variations in detail just described, the construction shown in Figs. 5$^a$, 5$^b$ is substantially identical with that described elsewhere.

The operation of my device is as follows: I will assume that at the start the parts have the positions indicated in Fig. 1. As the plug 33 is rotating in the direction indicated by the arrow in this figure, the port 43 of the plug is just breaking communication with the port 56 of the casing. This is shown more particularly by the diagram in Fig. 7. The parts being in the positions here indicated the explosive mixture from the inlet is free to pass into the cylinder 24 (as the piston 22 descends) through the following route: inlet 47, passage 48 to interior of the valve plug 33, out through valve port 42 (just beginning to communicate with casing port 55, see Figs. 7 and 2) passage 57, and port 56 into cylinder 24. At the start (see Figs. 1 and 7) the piston 21 is in its lowermost position. The valve port 42 has just left the casing port 52 and a charge of the explosive mixture is now in the cylinder 23 ready to be compressed as indicated in Fig. 7 by the upstroke of the piston 21. As the shaft rotates so as to complete a half-turn the explosive mixture in the cylinder 23 is compressed ready for explosion, and at the same time a charge of the explosive mixture is drawn into the cylinder 24, as above described, and as shown in Fig. 8. During the next successive half revolution of the shaft the explosive mixture in the cylinder 24 is compressed, while in cylinder 23 the gases of combustion expand, producing work. (See Fig. 9.) During a further half-revolution gases of combustion (following the explosion) expand in the cylinder 24, while the cylinder 23 exhausts as indicated in Fig. 6. As may be seen from Fig. 8, the gases of combustion cannot escape from either cylinder 23 or 24. The rotation being continued for another half turn, we find the parts occupying the relative positions indicated in Fig. 9, an explosion now taking place in the cylinder 24 while the cylinder 23 is discharging its gases of combustion through the following route: cylinder 23, casing port 53, valve port 44, passage 39, and wall 41 to exhaust passage 50 and exhaust port 49.

The purpose of the air port 45 and groove 46 is to admit air into some one of the cylinders for the purpose of turning the shaft into a position favorable for starting—thus avoiding the necessity for cranking up. The air is supplied under pressure into the port 51 and groove 46 from any extraneous source. Steam instead of air may be used for this purpose. Whenever it happens that the valve port 45 registers with either of the ports 52, 55, if it happens that either of the ports 53 or 56 is open, the air or steam under pressure is admitted to the cylinder and by its pressure upon the piston causes the latter to move and thus turn the shafting. The valve plug 33 thus enables an auxiliary power to be brought to bear upon the pistons for the purpose of moving them prematurely—that is, before the engine is properly in action.

Where the form shown in Figs. 5$^a$ and 5$^b$ is used, the action is practically the same as that above described. The only difference is that the exhaust takes place through the passages 43$^a$, 44$^a$, into the tubular member 44$^c$ and thence to the atmosphere.

I do not limit myself to the exact construction shown for the reason that my invention may be carried out in many ways.

Having thus described my invention, I claim as new and desire to secure by Letters Patent:

1. An internal combustion engine, comprising a plurality of cylinders, a casing provided with ports leading to said cylinders, and further provided with other ports and with passages connecting the latter with said first-mentioned ports, a valve plug revolubly mounted within said casing and provided with ports adapted to register with said ports leading to said cylinder, and further provided with ports for registering with said second-mentioned ports.

2. In an internal combustion engine, the combination of a cylinder, a valve casing disposed adjacent thereto and provided with a port for admitting explosive charges to said cylinder, said valve being provided with an auxiliary port and with an annular groove communicating with said auxiliary inlet port for the purpose of admitting small quantities of an elastic medium into said cylinder, said casing being further provided with an inlet connected with said groove in order to facilitate the admission of said elastic medium.

3. In an internal combustion engine, the combination of a cylinder, the piston mounted therein and movable relatively thereto, a casing provided with a port leading into said cylinder and further provided with a second port, and with a passage connecting said first mentioned port to said second mentioned port, said ports in said casing being so disposed that one is angularly in advance of the other, and a valve plug revolubly mounted within said casing, and provided with a port located in a plane of rotation coinciding with the position of said first mentioned port for the purpose of admitting an explosive mixture into said cylinder, said valve plug being further provided with an exhaust port located in a plane of rotation coinciding with the position of said last named port, said valve plug being further provided with an exhaust passage communicating freely at all times with said exhaust port, said exhaust passage being totally disconnected at all times from said first mentioned port, and means for supplying an explosive mixture into said plug and through said first mentioned port.

4. In an internal combustion engine, the combination of a cylinder, a piston mounted therein and movable relatively thereto, a casing provided with a port leading into said cylinder, and further provided with a second port and with a passage connecting said first mentioned port to said second port, the ports of said cylinder being located one in advance of the other, and a valve plug revolubly mounted within said casing and provided with a port located in a plane of rotation coinciding with the position of said first named port for the purpose of periodically admitting an explosive mixture into said cylinder, said valve plug being further provided with an exhaust port, the latter being in free communication with the atmosphere and totally disconnected at all times from said first mentioned port.

5. In an internal combustion engine, the combination of a cylinder, a piston mounted therein and movable relatively thereto, a casing provided with ports, and with a passage connecting said ports together, and a valve revolubly mounted within said casing and provided with an inlet port located in a plane of rotation coinciding with the position of one of said ports in the casing for the purpose of periodically registering therewith, said valve being further provided with an exhaust port located in a plane of rotation coinciding with the position of another of said ports of said casing, said exhaust port of said valve being at all times disconnected from said inlet port of said valve.

In testimony whereof I have signed my name to this specification in the presence of two subscribing witnesses.

ALBERT HARRIS FORSYTHE.

Witnesses:
   ALFRED REYNOLDS,
   CHARLES H. MILLER.